Jan. 7, 1930.  W. B. CHAPMAN  1,742,690
VEHICLE SUPPORT
Filed April 5, 1924   5 Sheets-Sheet 2
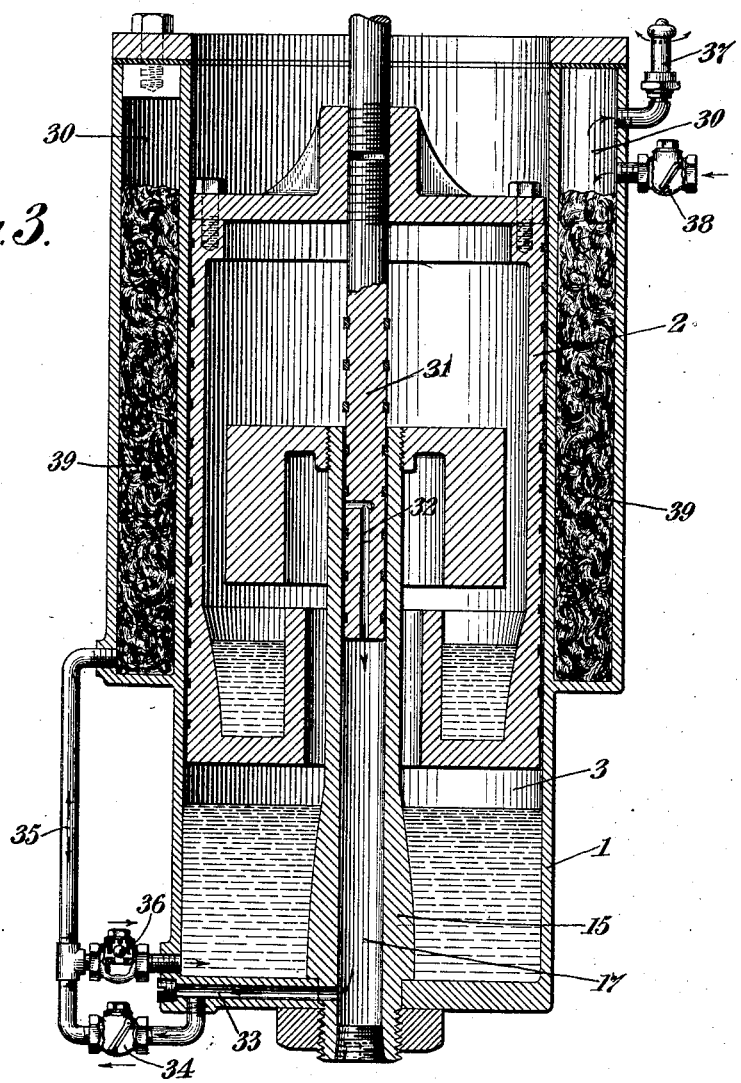
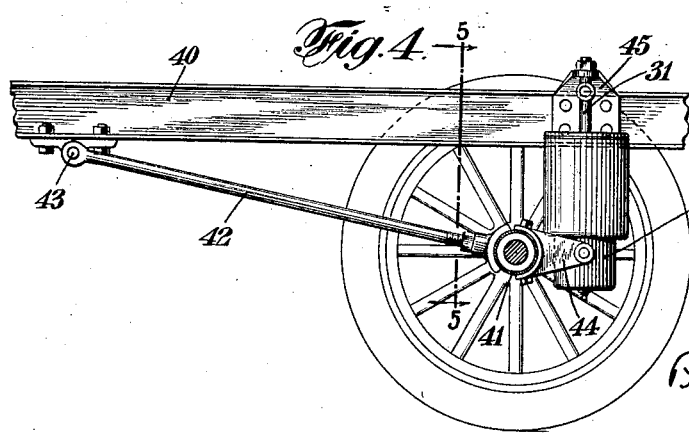
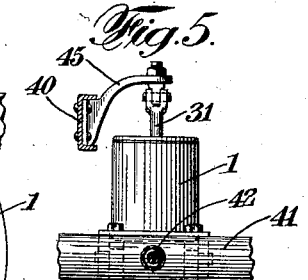
INVENTOR
William B. Chapman
BY
ATTORNEYS

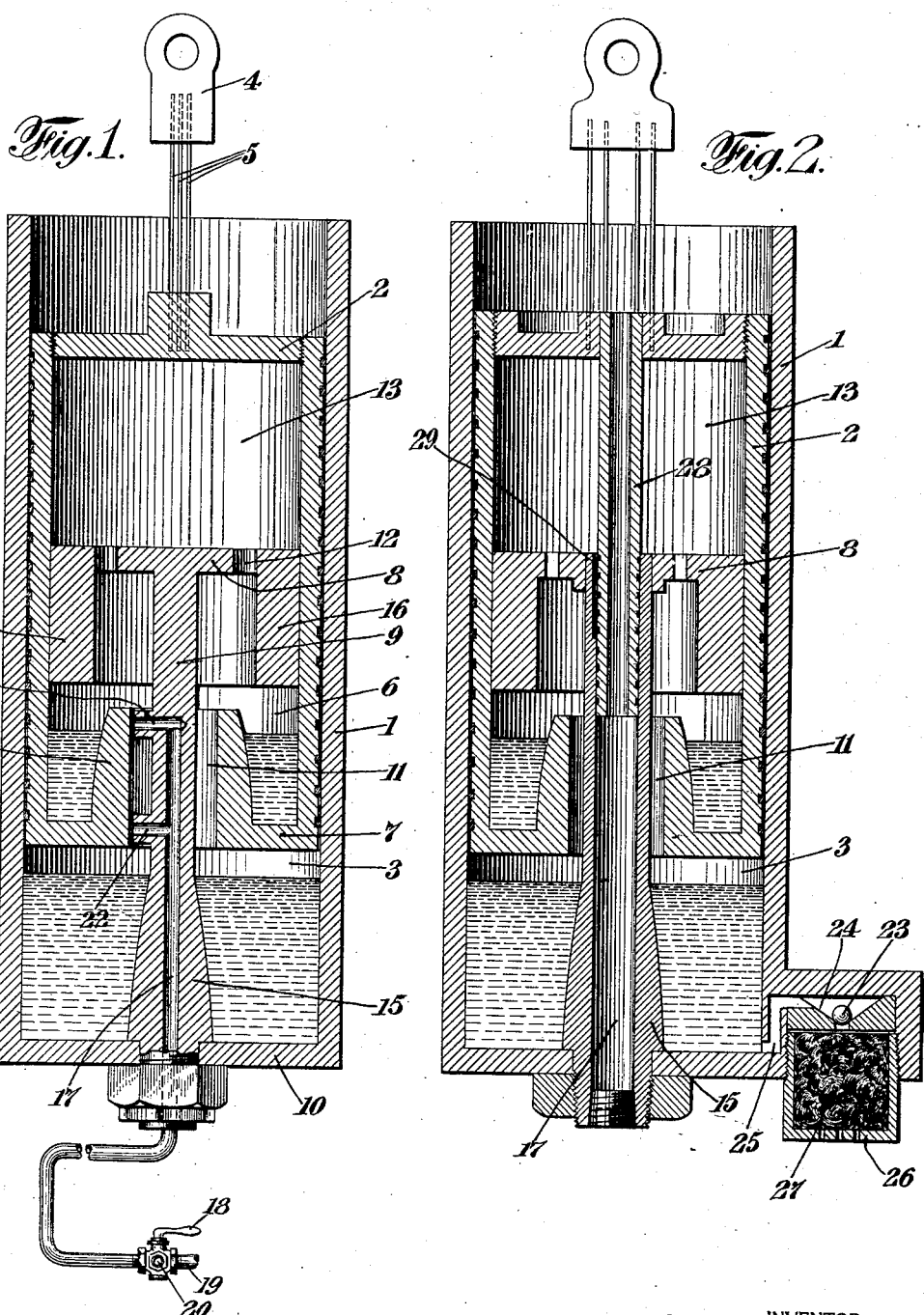

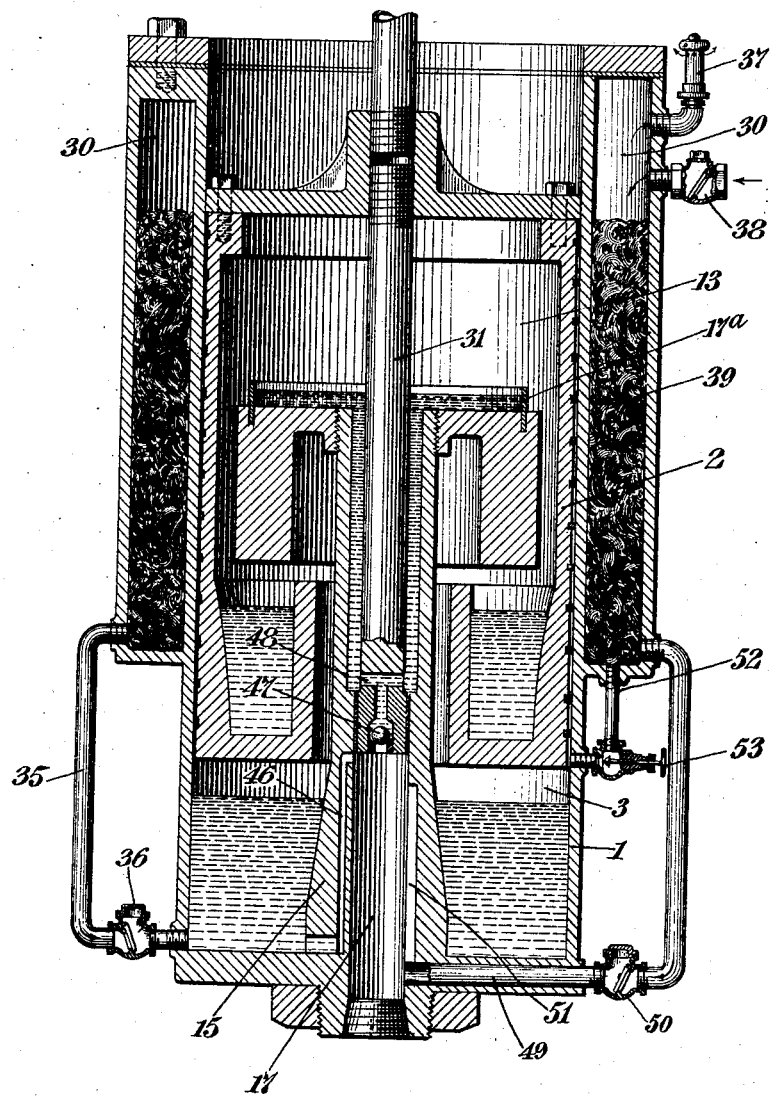

Jan. 7, 1930.  W. B. CHAPMAN  1,742,690
VEHICLE SUPPORT
Filed April 5, 1924  5 Sheets-Sheet 4
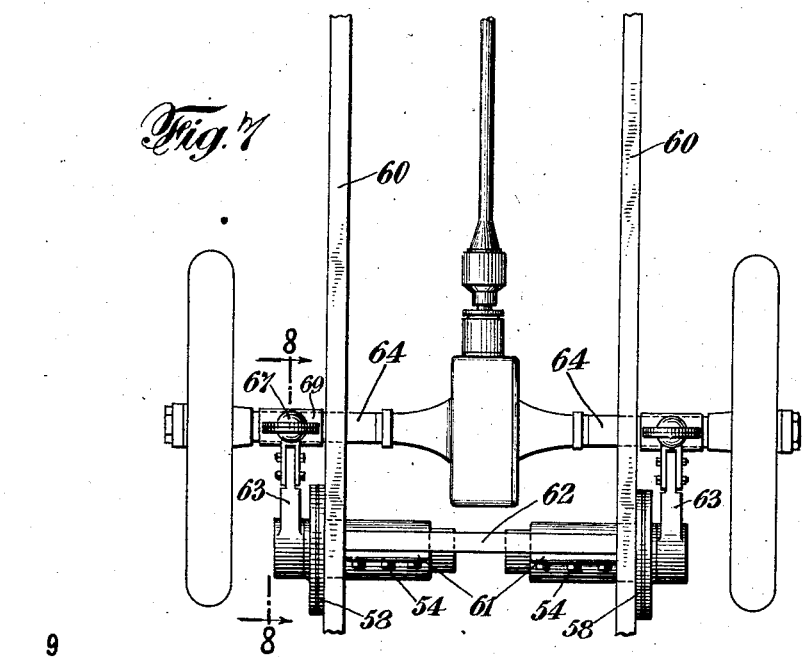
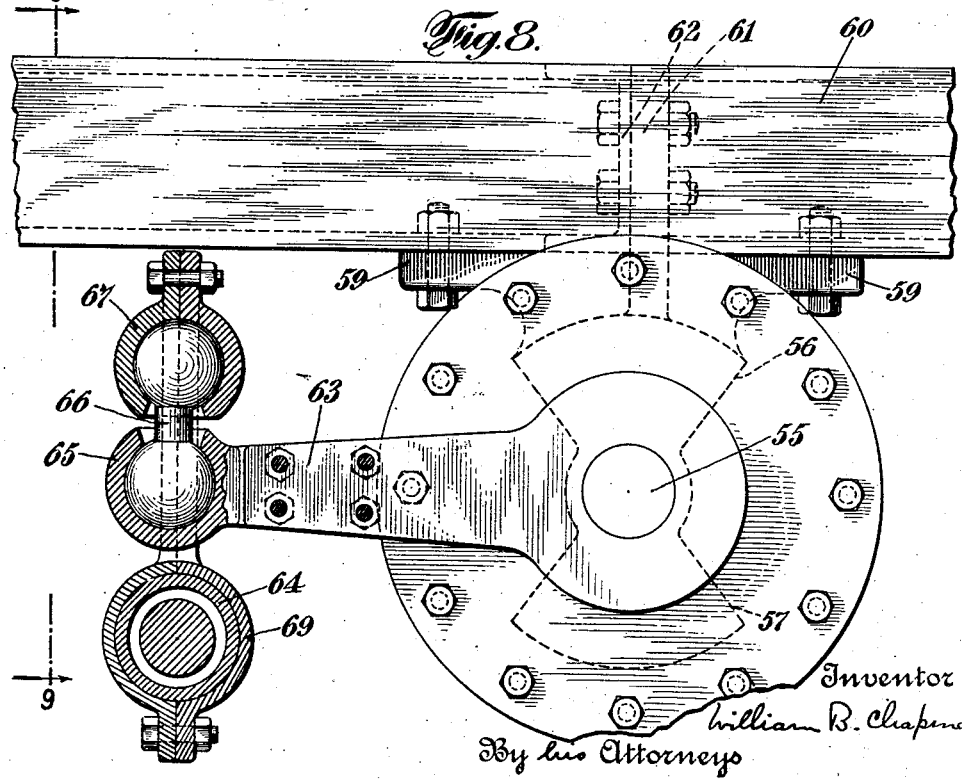
Inventor
William B. Chapman
By his Attorneys Jan. 7, 1930.  W. B. CHAPMAN  1,742,690
VEHICLE SUPPORT
Filed April 5, 1924  5 Sheets-Sheet 5

Inventor
William B. Chapman
By his Attorneys
Prindle, Bright, Neal & Dean

Patented Jan. 7, 1930

1,742,690

UNITED STATES PATENT OFFICE

WILLIAM B. CHAPMAN, OF JACKSON HEIGHTS, NEW YORK

VEHICLE SUPPORT

Application filed April 5, 1924. Serial No. 704,338.

This invention relates to a support adapted to be interposed between the frame and axle of a vehicle, or in other locations where desirable to cushion or absorb shocks between the parts in connection with which the support is used.

The support consists in general of two members movable with regard to each other but having a substantially fluid-tight chamber interposed therebetween, such members being respectively connected to the parts in connection with which the support is employed, whereby relative movement between such parts will cause the members to shift and thereby alter the size of the fluid-tight chamber, compressing or expanding the fluid within such chamber, as the case may be.

Preferably the support is so constructed that it offers but a relatively weak opposition to movements in the range of its normal or mid position, but affords a progressively increasing resistance to movement to and from positions remote from its mid position.

In the illustrated embodiments of the invention the members of the support in its intermediate range of movements are affected entirely, or almost entirely, by gaseous pressure but as the members of the support are urged to move to or from positions further away from normal position, their relative movements are opposed by a progressively increasing proportion of liquid under pressure until finally adjacent the extreme limits of motion, the proportion of liquid under pressure between such members becomes so large as to impose a definite limit upon such relative motion in either direction.

Another feature of the invention is the employment, in connection with the support, of devices for automatically maintaining the desired amount of fluid pressure therein, for example to compensate for leakage which may necessarily occur to some extent.

Another object is to provide a vehicle support of the above nature which will automatically adjust itself to different loads, that is to say, the pressure within the fluid chamber of the support may be automatically increased or reduced, in accordance with the load imposed upon the vehicle, in such manner that the vehicle support will tend to assume substantially the same normal position under different load conditions.

Further objects and advantages of the invention will be in part obvious, and in part specifically pointed out in the description hereinafter contained which, taken in connection with the accompanying drawings, discloses certain embodiments thereof. Such embodiments, however, are to be considered merely as illustrative of its principles. In the accompanying drawings:

Fig. 1 is a central longitudinal section of a relatively simple form of vehicle support constructed in accordance with the invention.

Fig. 2 is a view similar to Fig. 1 and showing a vehicle support of the same general character, but provided with a device for automatically building up fluid pressure therein.

Fig. 3 is a view generally similar to Fig. 2, but showing the vehicle support equipped with devices for automatically adjusting the fluid pressure in the support, to compensate for different loads imposed thereon.

Fig. 4 is a side view of a portion of a vehicle showing one method of mounting thereupon a vehicle support of the nature illustrated in Figs. 1, 2 and 3.

Fig. 5 is a fragmentary end view taken on the line 5—5 of Fig. 4, and looking in the direction of the arrows.

Fig. 6 is a central longitudinal section of a vehicle support generally similar to the one shown in Fig. 3 but with the addition of an auxiliary device operating in the middle register of movement of the support for automatically building up the fluid pressure therein.

Fig. 7 is a plan view showing certain parts of a vehicle equipped with a vehicle support embodying the principles of the invention but differing structurally in several respects from the embodiments shown in Figs. 1, 2, 3 and 6.

Fig. 8 is a sectional view taken on the line 8—8 of Fig. 7 and looking in the direction of the arrows.

Fig. 9 is a view taken on the line 9—9 of

Fig. 8, looking in the direction of the arrows; and

Figure 9:
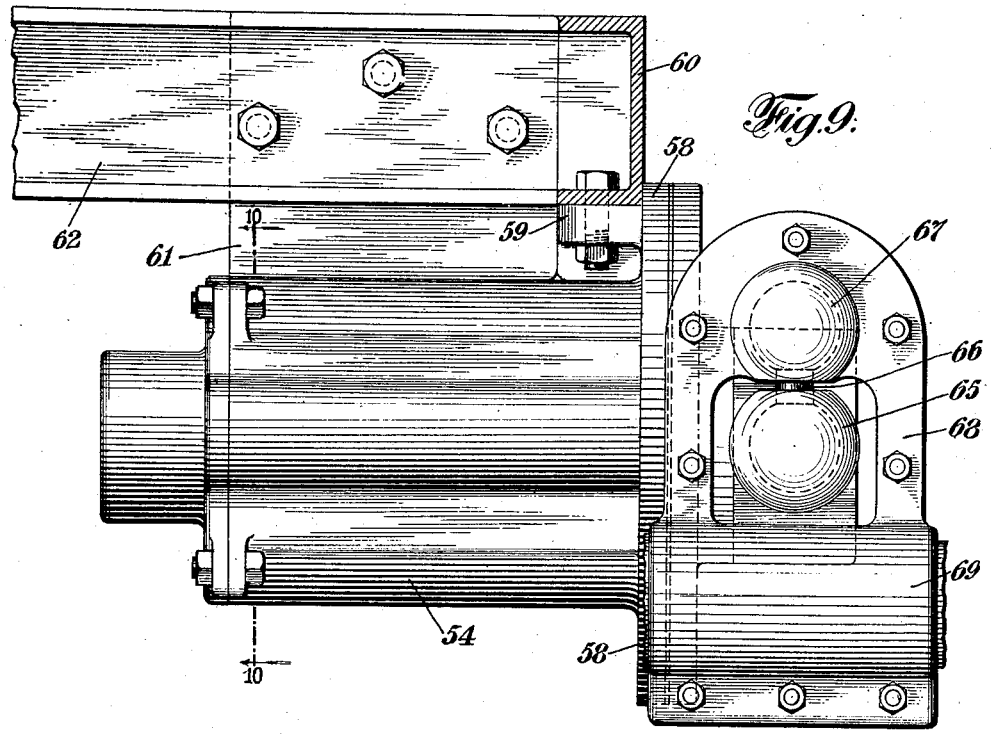
Figure 10:
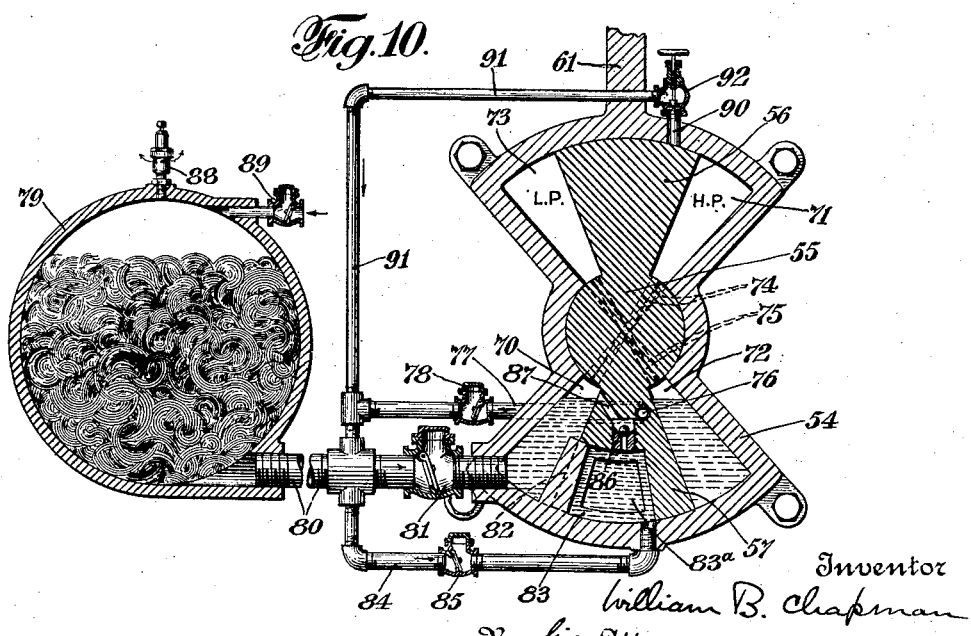

Fig. 10 is a sectional view taken on the line 10—10 of Fig. 9 but showing the vehicle support of the type illustrated in Figs. 7 to 9, equipped with devices for automatically building up the fluid pressure in the chamber of such support and altering the pressure therein to suit different load conditions.

In the form of the invention illustrated in Fig. 1 the two main members which make up the vehicle support, consist of a hollow cylinder 1, and a piston member 2 having substantially fluid-tight engagement therewith. It will be understood however that a certain amount of leakage inevitably will occur, and in fact that some leakage may even be of advantage. A pressure chamber 3 is interposed between the members 1 and 2 whereby, if one of such members is connected to the axle of a vehicle and the other to the vehicle body, the fluid under pressure in the chamber 3 will form a resilient cushion, absorbing shocks and tending to maintain a spacing between members 1 and 2, which is dependent upon the fluid pressure in the chamber 3 and the load carried by the vehicle.

As is later described in detail in connection with Figs. 4 and 5, the cylinder member 1 of Fig. 1 may be fixedly connected in substantially vertical position to the axle of the vehicle and the cylinder member 2 of the support connected to the body of the vehicle so that the load of the latter rests upon it as by means of an eye 4, shown in the upper part of Fig. 1. In the present instance the eye 4 is connected to the piston member 2 by means of a plurality of leaves 5 of springy metal which yield sufficiently to permit a certain amount of side sway in the body of the vehicle.

Preferably the fluid chamber 3 contains a certain amount of liquid and also air or other gas under pressure, the pressure of the air being sufficient to sustain the piston member 2 under normal conditions or when the members 1 and 2 are in the middle range of their possible movement with respect to each other. An auxiliary pressure chamber 6 is, however, provided, which in the present instance is formed between one head 7 of piston member 2 and an internal partition member 8 slidable with respect to the piston 2 and fixedly connected to cylinder 1 as by means of a stem 9 extending through the head 7 of the piston and supported in the end wall 10 of cylinder 1.

The auxiliary chamber 6 is in communication with pressure chamber 3 through a passageway 11 in piston head 7 and thus as the piston 2 moves toward the end wall 10 of the cylinder an increasing amount of the air under pressure in chamber 3, will be transferred to chamber 6 and also through the openings 12 in partition 8 to a further space 13 within the piston. As the piston 2 continues to move downwardly practically all of the air under pressure will be forced out of the chamber 3 until finally the oil in such chamber flows over an annular collar 14 projecting upwardly from piston head 7, and into the chamber 6.

The vehicle support is preferably arranged so that the farther the members 1 and 2 move away from their relative mid position, the greater will be the resistance imposed to a continuation of such movement.

In the present form of the invention the flow of liquid out of the chamber 3 is throttled more and more as the piston 2 descends until finally so little liquid is permitted to escape that further downward movement of the piston becomes impossible. As shown, the stem 9 is provided with a conical portion 15 adjacent its bottom, over which the collar 14 slides as the piston descends and the further the piston descends the more the passageway 11 is throttled by the conical portion 15 until finally further downward movement of the piston is prevented. The auxiliary chamber 6 is replenished with oil every time the piston 2 moves down far enough to force oil up from chamber 3 over collar 14.

Conversely, if the piston 2 tends to rise relative to the cylinder, the annular projection 16 on partition 8 will tend to force out any oil or liquid which has been entrapped in the auxiliary chamber 6; but as the part 16 projects further and further into such chamber it comes closer and closer to the conical outer surface of collar 14 and thus progressively throttles the flow of oil out of the chamber 6.

A vehicle support of the above nature will afford a relatively free degree of movement throughout its central range or register, but its resistance to further movement will increase progressively, as either limit of movement is approached, thus tending to stabilize the movements of the vehicle with a minimum of rebound and still be sensitive enough to absorb the relatively slight shocks.

It will be noted that in the middle register the shocks are taken up entirely by air under pressure which is very elastic, while near the extremities of motion the shocks are taken up by the liquid under pressure which is practically non-compressible or non-expansible, thus tending to check the movement more quickly and without excessive reactions or rebounds. The members 1 and 2 are urged back to mid position only by the air pressure therebetween, the oil being non-elastic.

The air pressure between the members 1 and 2 may be adjusted to keep such members in the same normal position with regard to each other under varying load conditions. For example, as shown in Fig. 1, the stem 9 may be provided with a conduit 17 controlled by a three-way valve 18 adapted to entirely shut off the conduit 17, or to connect the same selectively to an air pressure supply pipe 19 and a vent pipe 20. The conduit 17 leads to a pair of ports 21 and 22 which are both closed when members 1 and 2 are in mid position but are opened selectively if such members tend to assume a position at one side or the other of the desired mid position. As shown, the ports 21 and 22 are normally covered by collar 14 but if the piston 2 tends to come to rest below the position shown in Fig. 1 the port 22 will be uncovered, while if the piston tends to stay above the position shown, the port 21 will be uncovered.

Under normal conditions the valve 18 will be entirely shut off but if the operator suspects that, due to leakage or increased load, for example, the piston 2 has assumed a position lower than the one illustrated, he may throw valve 18 to connect conduit 17 with the pressure pipe 19 whereupon in case the port 21 is uncovered the fluid pressure will rise until the piston 2 moves up sufficiently to cover the port. Or if the operator suspects that the fluid pressure is too high due to lightening the load or for any other reason, he may throw valve 18 to connect conduit 17 with vent pipe 20, in which case, if the members be above mid position the piston 2 will fall until the port 22 is covered by the collar 14; or if the operator should erroneously open the valve when the members are below mid position, the piston 2 will fall to its extreme lower limit. The operator may then turn valve 18 to connect conduit 17 to pressure pipe 19 and piston 2 will rise until port 21 is covered by the collar 14. The valve 18 may be mounted on the dash-board or any other convenient location.

The structure of the support shown in Fig. 2 is in many respects similar to Fig. 1 and accordingly the features of Fig. 2 will be described only in so far as they differ from, or add to, the embodiment of the invention already described.

The support shown in Fig. 2 is arranged to utilize the relative movements between cylinder 1 and piston 2 to automatically maintain the requisite amount of air pressure in chamber 3. When the piston 2 moves to a position approaching the downward limit of its travel, the chamber 3 contains substantially nothing but oil which is non-compressible and the flow of further oil into the chamber upon the return upper movement of the cylinder 2 is highly throttled by conical portion 15. The result is that a partial vacuum tends to be created in chamber 3 upon such return movement, and if a one-way valve be interposed between the chamber and a source of air supply, this partial vacuum will lift the valve at the above time and draw in a certain amount of air to chamber 3. As shown in Fig. 2, a ball valve 23 is mounted in a conical seat 24 and normally prevents the passage of fluid outwardly through a passageway 25 leading to chamber 3; but under the conditions above described the partial vacuum in the chamber 3 lifts the ball valve 33 and permits a small increment of air to be drawn in. Preferably a dust trap is provided for the incoming air, this trap as shown, being constituted by a cap member 26 having wicking 27 therein.

A vent may be provided in connection with the support illustrated in Fig. 2, to relieve the air pressure therein, in case the piston 2 tends to assume an abnormally high position due to excessive air pressure. As shown, the piston 2 is provided with a central hollow tube 28 sliding within the conduit 17 which latter extends entirely through the partition 8, and a bleed opening 29 at the upper end of conduit 17 permits air to leak out from within the support whenever the bottom of the tube 28 rises above the lower end bleed opening 29. Thus the form of vehicle support shown in Fig. 2 will automatically pump up enough air pressure to keep the cylinder 2 in substantially normal mid position, under varying load conditions and will automatically relieve the pressure whenever necessary.

The vehicle support shown in Fig. 3 is in a general way similar to the one above described in connection with Fig. 2 except that, according to Fig. 3, the air supplied to chamber 3 or vented therefrom, is stored in an equalizing chamber 30 permitting the same body of air to be used over again instead of continually pumping in and exhausting fresh air with its entrained dust, as would be the case with Fig. 2.

Referring more particularly to Fig. 3, the equalizing chamber 30 is shown as being annular in form, and surrounding the cylinder member 1. The piston member 2 is provided with a central stem 31 sliding in the conduit 17 above described. In case the piston member 2 rises to an abnormally high position, a bleed passageway 32 in the stem 31 permits air to be exhausted from the interior of the support through a passageway 33 leading from conduit 17 through a one-way valve 34 and pipe 35 to the equalizing chamber 30, thus relieving excessive air pressures.

Whenever the piston member 2 approaches the lower limit of its relative travel and starts to move back toward mid position, a partial vacuum is created in the chamber 3, as described above in connection with Fig. 2, and a one-way valve 36 interposed between chamber 3 and pipe 35 lifts sufficiently to permit a certain amount of additional air to be drawn into chamber 3 from the equalizing chamber 30.

The chamber 30 may be provided with a relief valve 37 to prevent the building up of air pressure therein beyond a certain point, and with a one-way valve 38 for permitting sufficient air to be drawn in whenever the pressure in the chamber drops down too low. Some device, such as wicking 39, is also preferably provided in connection with the support to prevent the undue entrance of dust into the chamber 3.

Figs. 4 and 5 illustrate one method of mounting a vehicle support, such as has been been described above, upon one corner of a vehicle, as a substitute for the usual leaf springs. As shown in these figures, the longitudinal frame member 40 of the vehicle is pivotally connected to the axle 41, by means of a thrust arm 42 fixedly mounted on the axle and pivoted at 43 to the frame. Thus, as the vehicle passes over the rough places the axle 41 will tend to swing up or down relative to the frame of the vehicle about pin 43 as an axis. The cylinder member 1 of the support is trunnioned in a yoke 44 fixedly supported from the axle 41 while the stem 31 of the piston member is pivotally connected to a bracket 45 extending from the member 40. The above-mentioned pivotal mountings for the vehicle support permit it to adjust itself to relative back-and-forth movements between the frame and axle of the vehicle, while the parts of the support are made strong enough to hold the vehicle frame against side sway.

The vehicle support described in Fig. 6 is in general similar to the one described in Fig. 3 but with the addition of a device for automatically pumping up the pressure within chamber 3, which is not dependent for its operation upon movement of the piston member 2 to a position near its lower limit of motion; but which, on the other hand, acts in the central range of movement of the piston.

According to the embodiment of the invention illustrated in Fig. 6, the stem 31 of piston member 2 acts as a pumping plunger, and conduit 17 acts as a pump cylinder. A port 46 connects the conduit 17 to the lower part of chamber 3 with the result that in the operation of the vehicle support in mid range, the conduit 17 soon contains a substantial amount of oil. When plunger 31 is high enough to uncover port 46, oil will flow from chamber 3 through the port into the conduit 17, due to the relatively high fluid pressure in chamber 3 and the reduced pressure in conduit 17.

The plunger 31 as shown in Fig. 6 is provided with a one-way valve 47 interposed between conduit 17 and a passageway 48 adapted to place the conduit 17 in communication with the auxiliary chamber 13. Upon the down stroke of the plunger 31 the valve 47 lifts and permits all of the air and a portion of the oil contained in conduit 17 to flow through passageway 48 but still keeps the conduit 17 substantially full of oil up to the level of the point where port 46 enters the same. However, upon the up stroke of the plunger 31, so long as the plunger covers port 46, a partial vacuum will be created within conduit 17 and a certain amount of air will be drawn in, through a pipe 49 having a one-way valve 50 therein and connecting conduit 17 to the equalizing chamber 30. The conduit 17 may be provided with a by-pass 51 to render the plunger 31 inoperative near the lower limit of movement of piston member 2. In other words, the plunger will then operate as a pump only when the piston 2 is within the central range of its movements.

When the piston member 2 is working near the lower limit of motion, additional air may be drawn into the chamber 3 through a one-way valve 36 and pipe 35, in the same manner as described above in connection with Fig. 3.

The vehicle support of Fig. 6 is also shown as provided with a pipe 52 leading between the equalizing chamber 30 and a port within cylinder member 1 which will just be covered by the piston member 2 when the members are in normal position. A needle valve 53 in the pipe 52 will be opened sufficiently to permit a gradual leakage of air pressure from chamber 3 back to the equalizing chamber 30, when piston member 2 is above normal position. Thus the vehicle support will be continuously pumping in air pressure and relieving the same to seek the normal relative position of the cylinder and piston members.

Figs. 7 to 10 show the principles of the invention as applied to a structure of support which differs from the one previously described in several respects, and particularly in that the main members constituting the support are disposed in a horizontal position and have relative angular movement instead of the sliding movement above described. As is shown more clearly in Fig. 10 a cylinder member 54 is provided, and within the same is journaled a relatively movable member which, in the particular form illustrated, has a central hub 55 and vanes 56 and 57,—all having fluid-tight engagement with the walls of cylinder 54.

Figs. 7 to 9 show one method of mounting this type of support upon the axle of a vehicle, the cylinder 54 being provided with a head at one end having a flange 59 (Figs. 8 and 9) adapted to be bolted to one of the longitudinal frame members 60 of the vehicle. The body of the cylinder member 54 is also provided with a rib 61 clamped against a cross-piece 62 of the vehicle frame. Thus the cylinder member 54 is held rigid to the frame of the vehicle.

The other main member of the vehicle support is shown as provided with a lever arm 63 fastened at one end to the hub 55 and at its other end to the axle 64 of the vehicle. Thus as the axle moves up and down with regard to the frame of the vehicle, the lever arm 63 will move angularly to oscillate the vanes 56 and 57 with regard to cylinder member 54.

In the present instance the lever arm 63 is connected to the axle 64 through parts permitting a certain amount of universal motion, that is to say, the axle is permitted to move a slight amount either forwardly, rearwardly or laterally, with regard to the vehicle frame. As shown, the axle end of lever arm 63 is provided with a socket 65 enclosing one end of a ball-headed link 66, the other end of which is enclosed by a similar socket 67 carried by a coupling member 68, having a hub 69 clamped to the axle 64.

In the form of support above described, the frame of the vehicle is in effect suspended from the couplings 68 and the sockets 65 and 67 permit a certain amount of shifting between the vehicle frame and axle, until the link 66 strikes the walls of the openings in the sockets through which it passes.

Referring more particularly to Fig. 10, the vehicle support is preferably provided with diagonally opposed sets of fluid pressure chambers 70, 71, and 72, 73, respectively, the chambers 70 and 71 being normally in communication through a series of angularly offset openings 74 extending through hub 55, and the chambers 72 and 73 being also in communication through a similar set of openings 75.

In the present instance chambers 70 and 71 are the ones which normally sustain the load of the vehicle and I prefer to provide a relatively high fluid pressure in this set of chambers while the pressure in chambers 72 and 73 is relatively low. The chambers 70 and 72 are also filled partly with liquid and partly with air or other gas under pressure as previously described in connection with chamber 3, while the chambers 71 and 73,—as was the case with chamber 6 previously described,—receive the air under pressure which is forced out of chamber 70 or 72, as the case may be, when the main members of the support approach a limit of their relative movement. The openings 74 and 75 are also arranged to afford relatively free passage of fluid from a lower chamber to its corresponding upper chamber when the main members of the support are in their middle range of movement but as such members approach a limit of movement a progressively increasing number of these openings is cut off by the angular movement of the hub 55, and thus the transfer of fluid from a lower chamber to an upper chamber is progressively throttled, until finally nothing but liquid remains in the lower chamber and further extreme movement of the members is definitely checked.

The vehicle support as shown in Fig. 10 has also means to automatically pump up or relieve the pressure in the chambers to maintain the vanes 56 and 57 in substantially normal mid position notwithstanding their leakage or changes in load. The low pressure chambers 72 and 73 are subject only to undue increases in pressure due to leakage into such chambers from the high pressure chambers and accordingly it is not necessary to provide for increasing the pressure in such chambers. The relief of pressure is accomplished in the present instance by a port 76 in an end wall of cylinder 54 located at the proper level of the oil in the position of the vane which uncovers the port, and connected through a pipe 77 having a one-way valve 78 therein to an equalizing chamber 79. The port 76 is normally covered by vane 57, but when such vane attempts to assume a position too far to the left from that shown in Fig. 10, port 76 is uncovered permitting any excess pressure in chamber 72 or 73 to pass through pipe 77 and valve 78 to the equalizing chamber 79.

Preferably two devices are provided to maintain a sufficient pressure in the high pressure chambers 70 and 71. As shown, a pipe 80 having a one-way valve 81 therein communicates between the lower part of chamber 70 and equalizing chamber 79. When the vanes 56 and 57 turn in a clockwise direction as viewed in Fig. 10 toward the limit of their motion in this direction, chamber 70 will be substantially completely filled with oil, with the result that when the vanes move back toward normal position a certain amount of air will be drawn in from equalizing chamber 79 through pipe 80 and valve 81 to build up the pressure in the high pressure chambers.

I prefer also to provide a pressure sustaining device which will operate in the middle register of vanes 56 and 57. In the present instance, one end wall of the cylinder 54 is provided with an abutment 82 which projects part way into chamber 70 and the vane 57 is cut away to provide a pump chamber 83 between the abutment 82 and the vane. The chamber 83 will normally be substantially filled with oil, and when vane 57 moves to the right from the position shown in Fig. 10 a partial vacuum will be created in chamber 83, drawing a certain amount of air into the chamber through a pipe 84 connecting the chamber 83 to equalizing chamber 79, and having a one-way valve 85 therein. When vane 57 moves to the left as shown in Fig. 10, one-way valve 86 therein will lift, permitting the air to pass out of chamber 83 into high pressure chambers 70 and 71 through a passageway 87, and also permitting any excess oil to flow out of chamber 83.

The equalizing chamber 79 may be provided with valves 88 and 89 respectively, similar to the valves 37 and 38 described in connection with Fig. 3.

In case the pressure in chambers 70 and 71 is too great due to removal of load or any other cause, the vane 56 is forced out of said position and uncovers a vent opening 90, permitting the excess pressure to pass through pipe 91 and needle regulating valve 92 to equalizing reservoir 79.

While certain specific embodiments of the invention have been described, it will be obvious that many changes may be made therein without departing from its principles, as set forth in the appended claims.

I claim:

1. A vehicle support comprising relatively movable members having substantially fluid-tight engagement with each other, and having a fluid pressure chamber interposed therebetween, said chamber containing liquid and gas under pressure, an auxiliary pressure chamber in communication with said main pressure chamber whereby relative movement between said members will cause a transfer of fluid under pressure from one chamber to the other, said members being provided with co-acting parts progressively obstructing the flow of fluid under pressure from one chamber to another as said members approach both extremities of relative movement.

2. A vehicle support comprising relatively movable members having substantially fluid-tight engagement with each other, and having a fluid pressure chamber interposed therebetween, said chamber containing liquid and gas under pressure, said movable members being held apart by gaseous pressure when near their relative mid position, means being provided to remove the gas under pressure from between said members as they move toward one limit of their relative motion whereby the relative motion between such members is opposed by a progressively greater proportion of liquid under pressure as such members approach the limit of their relative movement.

3. A vehicle support comprising relatively movable members having substantially fluid-tight engagement, and having a fluid pressure chamber interposed therebetween, an auxiliary fluid pressure chamber in communication with said main chamber, said chambers containing both liquid and gas under pressure, together with means whereby a progressively increasing amount of liquid under pressure is confined in each of said chambers as such members move toward their corresponding limit of relative motion.

4. A vehicle support comprising relatively movable members having substantially fluid-tight engagement, and having a fluid pressure chamber interposed therebetween, an equalizing reservoir associated with said support, and means for automatically transferring fluid under pressure back and forth between said reservoir and said chamber to maintain a substantially constant mid position between said members under different load conditions.

5. A vehicle support comprising relatively movable members having substantially fluid-tight engagement, and having a fluid pressure chamber interposed therebetween, said chamber containing both liquid and gas under pressure, and being provided with means whereby, toward one limit of relative motion between such members, a relatively high proportion of fluid under pressure is interposed between said members, and means for automatically admitting gas to said chamber upon the movement of said members from the above-mentioned position toward their mid position.

6. A vehicle support comprising relatively movable members having substantially fluid-tight engagement and high and low pressure chambers interposed therebetween, an equalizing reservoir connected respectively to said chambers, and means for automatically transferring fluid selectively between said chambers and said reservoir upon the occurrence of predetermined pressure changes in said chambers.

7. A vehicle support comprising relatively movable members having substantially fluid-tight engagement and having high and low pressure fluid chambers interposed therebetween, said chambers containing both liquid and gas under pressure, an equalizing reservoir connected to said chambers and automatic means for transferring fluid between said reservoir and said chambers upon the occurrence of predetermined pressure changes in the latter, said reservoir being also provided with automatic means for admitting and discharging fluid therefrom upon the occurrence of predetermined pressure changes therein.

8. A vehicle support comprising relatively movable members having substantially fluid-tight engagement and having a fluid pressure chamber interposed therebetween, said chamber containing liquid and gas under pressure, a gas storage chamber and means for utilizing pressure changes upon said liquid as caused by relative movement between such members to supply further gas from said storage chamber to said pressure chamber.

9. A vehicle support comprising relatively movable members having substantially fluid-tight engagement and having a fluid pressure chamber interposed therebetween, said chamber containing liquid and gas under pressure, means being provided whereby near both limits of the relative movement between said members, substantially all liquid is interposed therebetween.

10. A vehicle support comprising relatively movable members having a substantially fluid-tight engagement and having a fluid pressure chamber interposed therebetween, automatic means for altering the pressure of said chamber to maintain a substantially constant mid-position for said members under varying load conditions and means whereby the fluid in said chamber progressively dampens the relative motion of said members in both directions away from mid-position and progressively decreases said dampening effect in motion from either extreme position toward said mid-position.

11. A vehicle support comprising relatively movable members having substantially fluid-tight engagement with each other, and having a fluid pressure chamber interposed therebetween, said chamber containing liquid under pressure, a source of liquid supply normally disconnected from said chamber, means being associated with said chamber whereby the reduced pressure on the liquid in said chamber which occurs during rebound movements of said members, is caused to draw fluid from said source of supply into said chamber.

In testimony that I claim the foregoing, I have hereunto set my hand this 3rd day of March, 1924.

WILLIAM B. CHAPMAN.